United States Patent
Chu et al.

(10) Patent No.: US 11,425,320 B2
(45) Date of Patent: Aug. 23, 2022

(54) CMOS IMAGE SENSOR AND AUTO EXPOSURE METHOD PERFORMED IN UNITS OF PIXELS IN THE SAME

(71) Applicant: SAMSUNG ELECTRONICS CO., LTD., Suwon-si (KR)

(72) Inventors: Myunglae Chu, Hwaseong-si (KR); Minwoong Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/741,234

(22) Filed: Jan. 13, 2020

(65) Prior Publication Data
US 2020/0396401 A1    Dec. 17, 2020

(30) Foreign Application Priority Data

Jun. 14, 2019  (KR) .......................... 10-2019-0071066

(51) Int. Cl.
| | |
|---|---|
| H04N 5/355 | (2011.01) |
| H04N 5/3745 | (2011.01) |
| H04N 5/369 | (2011.01) |

(52) U.S. Cl.
CPC .......... *H04N 5/3559* (2013.01); *H04N 5/379* (2018.08); *H04N 5/37455* (2013.01)

(58) Field of Classification Search
CPC ... H04N 5/3559; H04N 5/37455; H04N 5/379
See application file for complete search history.

(56) References Cited

U.S. PATENT DOCUMENTS

| | | | |
|---|---|---|---|
| 6,580,454 B1 | 6/2003 | Perner et al. | |
| 6,809,769 B1 | 10/2004 | Yang | |
| 6,975,355 B1 | 12/2005 | Yang et al. | |
| 7,903,159 B2 | 3/2011 | Zarnowski et al. | |
| 8,537,241 B2 | 9/2013 | Ayers et al. | |
| 8,625,012 B2 | 1/2014 | Yuan et al. | |
| 9,986,181 B2 | 5/2018 | Yao et al. | |
| 2007/0222879 A1* | 9/2007 | Glenn ................ | H04N 5/37452 348/297 |
| 2008/0106622 A1* | 5/2008 | Turchetta ........... | H04N 5/37455 348/294 |
| 2008/0218614 A1* | 9/2008 | Joshi .................. | H04N 5/35572 348/262 |

(Continued)

FOREIGN PATENT DOCUMENTS

| | | |
|---|---|---|
| JP | 4389190 | 10/2009 |
| JP | 4686060 | 2/2011 |

(Continued)

*Primary Examiner* — Jason A Flohre
(74) *Attorney, Agent, or Firm* — F. Chau & Associates, LLC

(57) ABSTRACT

The complementary metal oxide (CMOS) image sensor CIS includes a plurality of pixels arranged in a two-dimensional (2D) array and each including a photodiode, a plurality of analog-to-digital converters (ADCs) configured to perform auto exposure in units of the pixels, and a readout circuit configured to read pixel signals of the pixels, in rows. The plurality of pixels and the plurality of ADCs are the same in number and are connected in a one-to-one correspondence to each other. Each of the plurality of ADCs performs AE on a corresponding one of the pixels.

19 Claims, 17 Drawing Sheets

(56) References Cited

U.S. PATENT DOCUMENTS

| | | | | |
|---|---|---|---|---|
| 2008/0297609 A1* | 12/2008 | Song | .................... | H04N 5/3745 |
| | | | | 348/207.99 |
| 2009/0244346 A1* | 10/2009 | Funaki | ............... | H04N 5/37455 |
| | | | | 348/308 |
| 2010/0181464 A1* | 7/2010 | Veeder | ............... | H04N 5/37455 |
| | | | | 250/214 R |
| 2010/0194956 A1* | 8/2010 | Yuan | .................. | H04N 5/37455 |
| | | | | 348/308 |
| 2013/0215286 A1* | 8/2013 | Ohya | ................ | H04N 5/37455 |
| | | | | 348/222.1 |
| 2018/0139379 A1 | 5/2018 | Nakata | | |
| 2018/0191972 A1* | 7/2018 | Berner | ................ | H04N 5/3745 |
| 2018/0352184 A1* | 12/2018 | Ikedo | ................. | H04N 5/36961 |
| 2019/0082125 A1 | 3/2019 | Smith et al. | | |
| 2019/0132539 A1* | 5/2019 | Otaka | ................ | H04N 5/37455 |
| 2020/0204749 A1* | 6/2020 | Mori | ................. | H04N 5/37455 |

FOREIGN PATENT DOCUMENTS

| | | |
|---|---|---|
| JP | 2012523750 | 10/2012 |
| JP | 2018023170 | 2/2018 |

\* cited by examiner

CMOS IMAGE SENSOR AND AUTO EXPOSURE METHOD PERFORMED IN UNITS OF PIXELS IN THE SAME

CROSS-REFERENCE TO RELATED APPLICATION

This U.S. non-provisional patent application claims the benefit of priority under 35 U.S.C. § 119 to Korean Patent Application No. 10-2019-0071066, filed on Jun. 14, 2019, in the Korean Intellectual Property Office, the disclosure of which is incorporated by reference in its entirety herein.

BACKGROUND

1. Technical Field

The inventive concept relates to an image sensor, and more particularly, to a CMOS image sensor (CIS) in which analog-to-digital (A/D) conversion may be performed in units of pixels.

2. Discussion of Related Art

A complementary metal oxide semiconductor (CMOS) image sensor (CIS) may include a pixel area and a logic area. In the pixel area, a plurality of pixels are arranged in a two-dimensional (2D) array, and unit pixels of the pixels may include a photodiode and pixel transistors. In the logic area, signal processing circuits for processing pixel signals from the pixel area may be arranged. A wide dynamic range (WDR) function may be included in a CIS. The WDR function may improve quality of an image by increasing the brightness of a dark portion and reducing the brightness of a bright portion caused by artificial or natural light (e.g., sunlight). However, since a high-capacitance capacitor is typically needed to perform the WDR function, a manufacturing cost of the CIS may increase.

SUMMARY

At least one embodiment of the inventive concept is directed to providing a complementary metal oxide (CMOS) image sensor (CIS) capable of achieving a wide dynamic ranging (WDR) without an additional high-capacitance capacitor, and an auto-exposure (AE) method performed in units of pixels in the CIS.

According to an exemplary embodiment of the inventive concept, a CMOS image sensor (CIS) includes a plurality of pixels arranged in a two-dimensional (2D) array and each including a photodiode, a plurality of analog-to-digital converters (ADCs) configured to perform auto exposure (AE) in units of the pixels, and a readout circuit configured to read pixel signals of the pixels, in rows. The pixels and the plurality of ADCs are the same in number and are connected in a one-to-one correspondence to each other, and each of the plurality of ADCs performs AE on a corresponding one of the pixels.

According to an exemplary embodiment of the inventive concept, a CIS includes a plurality of pixels arranged in a 2D array and each including a photodiode, a plurality of ADCs configured to perform AE in units of the pixels, and a readout circuit configured to read pixel signals of the pixels, in rows, wherein the number of the ADCs is equal to a number of columns of the 2D array, and each of the ADCs is connected to all pixels included in a corresponding one of the columns and performs AE on a corresponding one of the pixels in units of the rows.

According to an exemplary embodiment of the inventive concept, a CIS includes an upper chip in which a plurality of pixels each including a photodiode are arranged in a 2D array, and at least one lower chip including a plurality of ADCs and signal processing circuits, wherein the plurality of ADCs perform auto exposure in units of pixels and the signal processing circuits process pixel signals from the pixels, wherein the upper chip is stacked on the at least one lower chip, and the pixels and the ADCs are connected in a one-to-one correspondence to each other.

According to an exemplary embodiment of the inventive concept, there is provided a method of performing auto exposure (AE) in units of pixels in a CIS, which includes the pixels each including a photodiode and a plurality of ADCs connected in one-to-one correspondence to the pixels. The method includes: resetting floating diffusion (FD) regions of the pixels and performing analog-to-digital (AD) conversion on reset signals of reset transistors of the pixels by the plurality of ADCs; transferring charges accumulated in the photodiodes to the FD regions by turning on a transfer transistors of the pixels and thereafter performing AD conversion on pixel signals of the pixels and starting an exposure in a current-frame period; and performing AE on the pixels by the plurality of ADCs during the exposure in the current-frame period.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
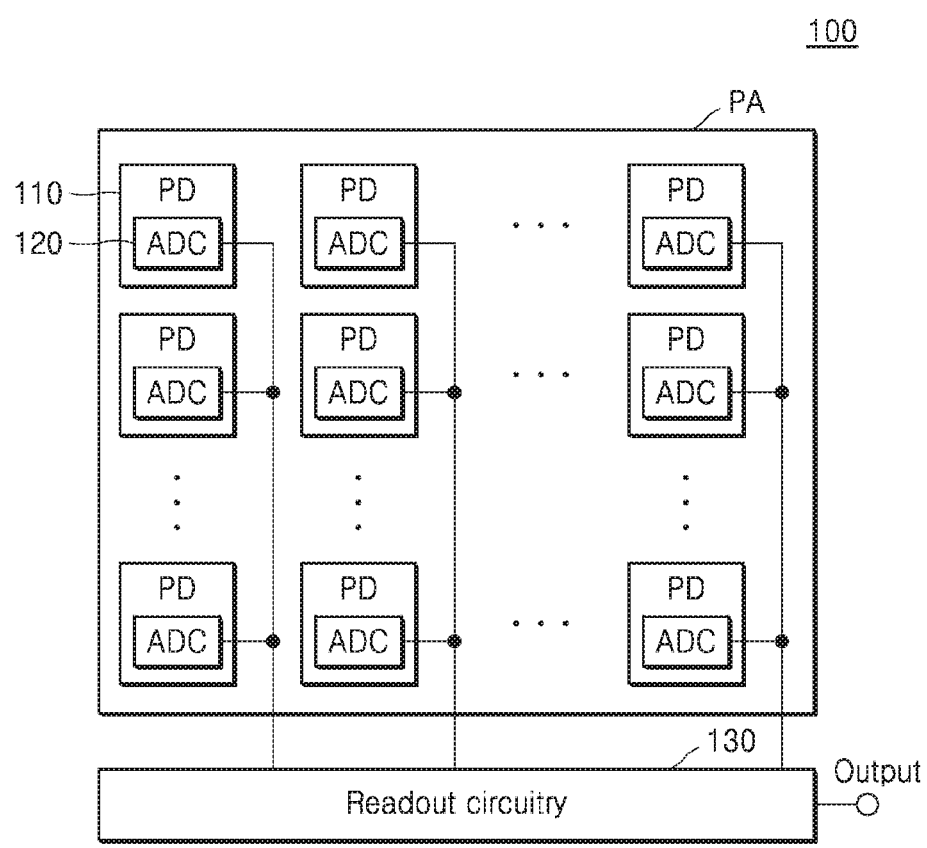
FIG. 1 is a block diagram of a CMOS image sensor (CIS) according to an exemplary embodiment of the inventive concept.

Hereinafter, exemplary embodiments of the inventive concept will be described in detail with reference to the accompanying drawings. Like reference numerals refer to like elements throughout this application.

FIG. 1 is a block diagram of a CMOS image sensor (CIS) 100 according to an exemplary embodiment of the inventive concept.

Referring to FIG. 1, the CIS 100 of the present embodiment includes a plurality of pixels 110, a plurality of analog-to-digital converters (ADCs) 120 (e.g., circuits), and a readout circuitry 130 (e.g., a circuit).

The plurality of pixels 110 may be arranged in a two-dimensional (2D) array in a pixel area PA. A photodiode (PD) 112 (see FIG. 3), a transfer transistor (TR) 114 (see FIG. 3), a reset TR 116 (see FIG. 3), and a floating diffusion (FD) region 118 (see FIG. 3) may be provided in each of the plurality of pixels 110. FIG. 1 illustrates only the PDs 112 in the plurality of pixels 110 for convenience of explanation.

In an exemplary embodiment, the PD 112 is a P-N junction diode, and may generate charges (e.g., electrons), which are negative charges, and holes, which are positive charges, in proportion to the amount of incident light. The transfer TR 114 may transmit the charges generated by the PD 112 to the FD region 118.

The reset TR 116 may periodically reset the charge stored in the FD region 118. In addition, the reset TR 116 may be connected to the ADC 120 of the pixel 110 and thus may reset the FD region 118 of the pixel 110 to perform an auto exposure (AE) of the pixel 110 when charges overflow or saturate in the FD region 118 of the pixel 110. AE performed in units of pixels by the reset TRs 116 and the ADCs 120 will be described in more detail with reference to FIGS. 3 to 4B below.

The plurality of ADCs 120 may be arranged in a 2D array to correspond to the plurality of pixels 110. However, an arrangement structure of the plurality of ADCs 120 is not limited to the 2D array. For example, the plurality of ADCs 120 may be arranged in a different arrangement structure than the 2D array as long as they are connected in a one-to-one correspondence to the plurality of pixels 110.

FIG. 1 illustrates that each of the ADCs 120 is provided in a corresponding pixel 110 among the pixels 110 to explain the concept that the ADCs 120 and the pixels 110 are connected to each other in one-to-one correspondence, but in an exemplary embodiment, each of the ADCs 120 is not provided in the corresponding pixel 110 among the pixels 110. For example, as in a structure of a CIS 100e of FIG. 10A or a CIS 100f of FIG. 11, the ADCs 120 and the pixels 110 may be provided in different chips and connected to each other via TSVs 140a and 140b of FIG. 10B, Copper-to-Copper (Cu—Cu) bonding, internal interconnections of the chips, or the like.

Figure 3:
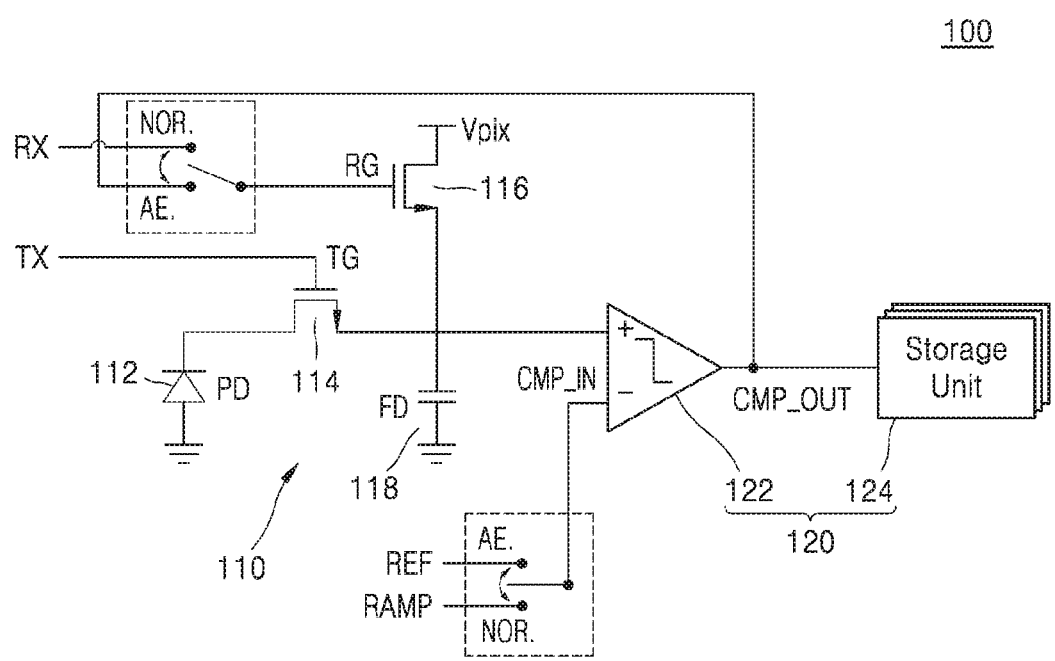
FIG. 3 is a circuit diagram of the CIS of FIG. 1 including an analog-digital converter (ADC) for each pixel.

Each of the ADCs 120 may include a comparator 122 (e.g., a comparison circuit) of FIG. 3 and a storage unit 124 (e.g., a storage device) of FIG. 3. The comparator 122 may compare two input signals and output a low (L) signal or a high (H) signal. For example, a first signal, which is a variable signal input via a first input terminal, and a second signal, which is a constant signal input via a second input terminal, may be compared with each other, and the H signal may be output when a voltage of the first signal is greater than or equal to that of the second signal and the L signal may be output when the voltage of the first signal is less than that of the second signal. Here, the L signal may be represented by "0" and the H signal may be represented by "1". A polarity of an output of the comparator 122 is not limited to that described above and may be configured conversely. The L signal may have a first logic level and the H signal may have a second other logic level.

The storage unit 124 may store information regarding the change of an output signal of the comparator 122 from the L signal to the H signal. The storage unit 124 may include various types of electronic devices capable of storing information regarding the change of the output signal from the L signal to the H signal. For example, the storage unit 124 may include a shift register, a counter, a memory element, or the like. For example, the counter could include multiple counter circuits, where one of the circuit circuits is incremented each time the change occurs with respect to a single pixel during a certain period (e.g., a frame period).

In the CIS 100 of the present embodiment, the ADC 120 may perform 1-bit analog-to-digital (AD) conversion or N-bit AD conversion (here, N is an integer greater than or equal to 2). For example, in the CIS 100 of the present embodiment, the ADC 120 may operate in an AE mode in which AE is performed in units of pixels and a normal mode in which AD conversion is performed on pixel signals of the pixels. In the AE mode, AE is performed by comparison with one reference voltage and thus corresponds to 1-bit AD conversion. In a normal mode, a pixel signal is read by comparison with a stepped ramp voltage including multi-voltage levels and thus corresponds to N-bit AD conversion. Operations of the ADC 120 in the AE mode and the normal mode will be described in more detail with reference to FIG. 3 below.

The readout circuitry 130 is a circuit which reads a pixel signal or a photo signal corresponding to a charge generated in each of the pixels 110, and may read pixel signals in rows from the pixels 110 arranged in a pixel array. For example, in FIG. 1, the readout circuitry 130 may operate to read pixel signals of the uppermost pixels 110 in a first row and then read pixel signals of the pixels 110 in a second row.

In the CIS 100 of the present embodiment, the ADCs 120 are implemented in units of pixels and thus charge overflow or saturation in the pixels 110 may be detected during an effective integration time (EIT) and AE may be performed in units of pixels. In addition, because AE is performed in units of pixels by the ADCs 120, saturation of charges in the pixels 110 may be prevented, an EIT of each pixel may be adjusted, and errors or information loss in pixel signals due to charge saturation may be also prevented. Therefore, in the CIS 100 of the present embodiment, limitations on full-well capacity (FWC) of fine-size pixels may be overcome and WDR may be easily performed without an additional high-capacity capacitor, based on AE performed in units of pixels by the ADCs 120 for respective pixels and an EIT adjusted in units of pixels.

For reference, in the CIS 100 of the present embodiment, AD conversion is performed by the ADCs 120 corresponding to pixel signals of the pixels 110 and thus the pixels 110 may be considered digital pixels. The CIS 100 of the present embodiment may be referred to as a digital pixel sensor (DPS), based on the digital pixels.

Figure 2A:
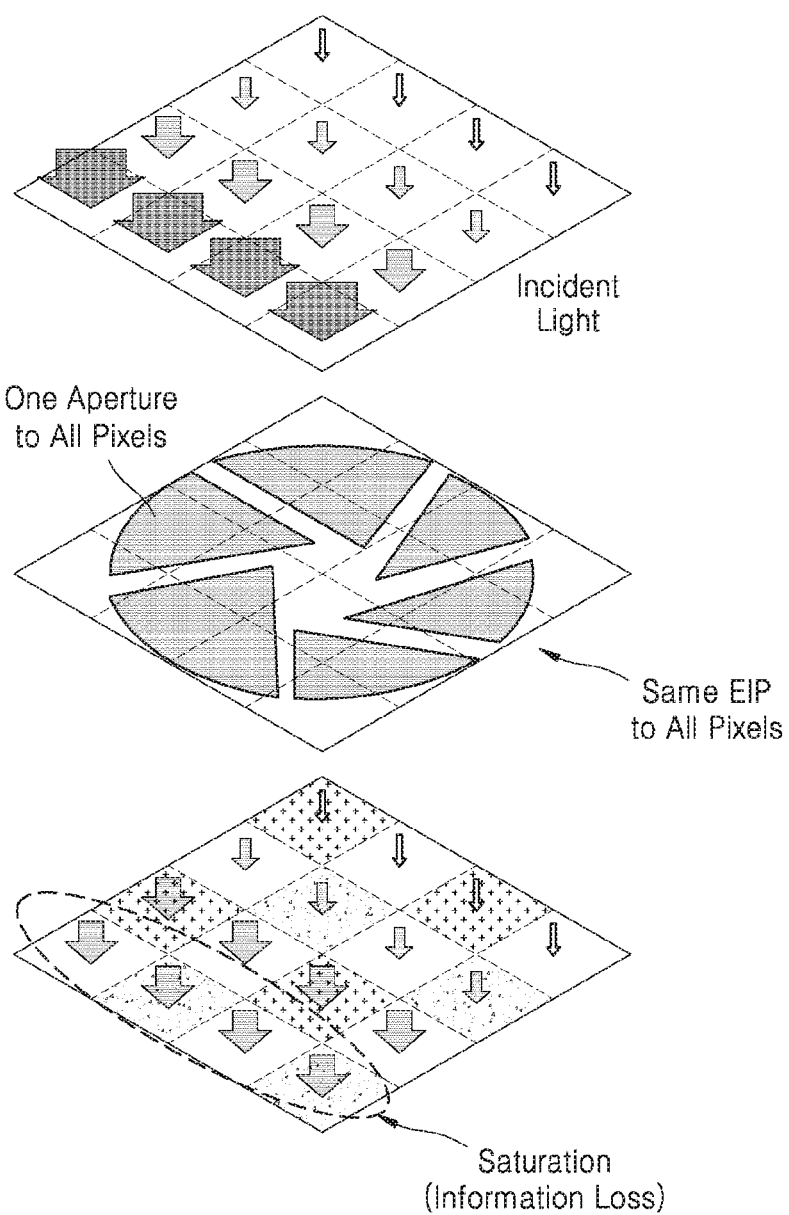
FIGS. 2A and 2B are conceptual diagrams for explaining an effect of preventing information loss in the CIS of FIG. 1.
Figure 2B:
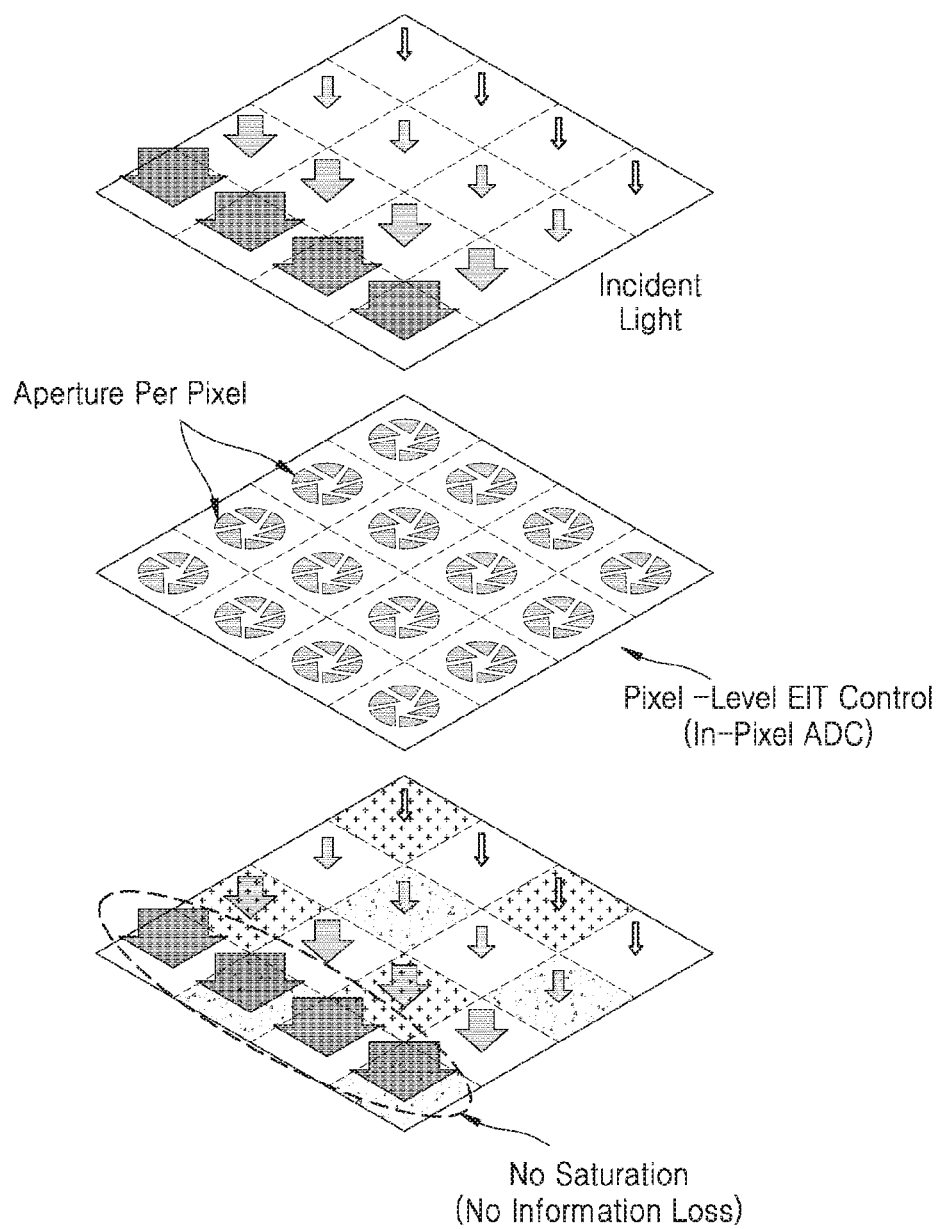

FIGS. 2A and 2B are conceptual diagrams for explaining an effect of preventing information loss in the CIS of FIG. 1. FIG. 2A illustrates a phenomenon that information is lost due to charge saturation in a general CIS. FIG. 2B illustrates an effect of preventing information loss in the CIS of FIG. 1 through AE by ADC in units of pixels.

Referring to FIG. 2A, in general, a CIS may have a structure in which one ADC is disposed per column, that is, a column ADC structure. That is, in a CIS of the column ADC structure, all pixels arranged in one column are connected to one ADC and AD conversion is performed thereon through the same ADC. In addition, as shown in a middle part of FIG. 2A, in the case of a CIS of a general column ADC structure, all pixels are subjected to the same EIT through one exposure process in units of frames since one aperture is used. Intensities of light incident on a pixel array of the CIS may vary according to positions of the light as shown in an upper part of FIG. 2A. However, because all the pixels are subject to the same EIT, information may be lost due to saturation of charges and an error may occur in pixel signals in the case of pixels corresponding to high-intensity light. In other words, information corresponding to large arrows in the upper part of FIG. 2A may be lost due to charge saturation at pixels and information corresponding to downsized arrows in a lower part of FIG. 2A is stored instead, and thus, an error occurs in the pixel signals.

Referring to FIG. 2B, in the CIS 100 of the present embodiment, the ADCs 120 are provided in units of pixels and AE may be performed in units of pixels by the ADCs 120. Accordingly, in the CIS 100 of the present embodiment, an EIT may be adjusted in units of pixels as shown in the middle part of FIG. 2B since an aperture is used for each pixel. As such, because an EIT is adjusted for each pixel, charge saturation even in pixels corresponding to high-intensity light may be prevented so that all information may be retained, thereby preventing the occurrence of an error in pixel signals. In other words, information corresponding to the large arrows in the upper part of FIG. 2B is stored as information corresponding to arrows of the same sizes as the large arrows as shown in the lower part of FIG. 2B and thus no errors occur in pixel signals.

The concept of adjusting an EIT of each pixel through AE for each pixel will be described in more detail below. When charge saturation or overflow occurs due to high intensity light incident on a pixel 110, the pixel 110 is reset through AE by the ADC 120 and information regarding the number of reset times is stored. In addition, information regarding a charge remaining in the pixel 110 after a final reset is obtained as a pixel signal by performing a general AD conversion by the ADC 120. Thereafter, the pixel signal for the pixel 110 may be accurately calculated by compensating for a pixel signal, based on the information regarding the number of reset times. For example, an image compensation operation may be performed on an image signal represented by one or more of the pixel signals for wide dynamic range (WDR) by performing the AE in units of the pixels.

As a concrete example, when the amount of saturation charge in the pixel 110 is A, resetting is performed n times for one frame, and the amount of charge remaining in the pixel 110 after a last reset is B, a total amount of charges generated by the pixel 110 for the one frame may be calculated as A×n+B and the pixel signal may be compensated for based on the total amount of charges. A pixel signal for the amount of charge remaining in the pixel 110 after the last reset may be extracted for a remaining time after resetting is performed several times other than a total time corresponding to the one frame. Therefore, an EIT of the pixel signal of the pixel 110 in which saturation occurs, i.e., the pixel 110 in which resetting is performed, is shorter than an EIT of a pixel signal of the pixel 110 in which saturation does not occur. As a result, the EIT of the pixel 110 may be adjusted or reduced through AE by the ADC 120.

FIG. 3 is a circuit diagram of the CIS of FIG. 1 including an ADC for each pixel according to an exemplary embodiment of the inventive concept. Parts described above with reference to FIGS. 1 to 2B will be briefly described or a description thereof will be omitted here.

Referring to FIG. 3, in the CIS 100 of the present embodiment, a pixel 110 may include a PD 112, a transfer TR (TG) 114, a reset TR (RG) 116, and an FD region 118. An ADC 120 may include a comparator 122 (e.g., a comparator circuit) and a storage unit 124 (e.g., storage device). In FIG. 3, the FD region 118 is represented by a symbol of a capacitor configured to store charges, based on a function thereof.

In the CIS 100 of the present embodiment, the ADC 120 may operate in one of two modes. For example, the ADC 120 may operate in an AE mode AE. in which AE is performed on a corresponding pixel, and a normal mode NOR. in which AD conversion is performed on a pixel signal of a pixel.

In detail, in the AE mode AE., the FD region 118 is connected to a first input terminal of an input terminal CMP_IN of the comparator 122, and a reference voltage REF is applied to a second input terminal of the input terminal CMP_IN of the comparator 122. In the AE mode AE., an output terminal CMP_OUT of the comparator 122 is connected to the storage unit 124 and a gate of the reset TR 116. In the AE mode AE., a transfer TR line TX is connected to a gate of the transfer TR 114 and an H signal (e.g., "1") may be input via the transfer TR line TX, so that the transfer TR 114 may be maintained in an ON state.

In the AE mode AE., a charge generated by the PD 112 may be accumulated in the FD region 118, and a voltage of the FD region 118 corresponding to the amount of accumulated charges may be compared with the reference voltage REF by the comparator 122. When the voltage of the FD region 118 is lower than the reference voltage REF, an L signal is maintained as an output of the comparator 122. That is, "0" is maintained. When the voltage of the FD region 118 is higher than or equal to the reference voltage REF, the output of the comparator 122 is changed from the L signal to the H signal. That is, "0" is changed to "1". The H signal may be a signal have a high logic level and the L signal may be a signal having a low logic level. The H signal may have a first logic level and the L signal may have a second logic level that differs from the first logic level.

For reference, because charges accumulated in the FD region 118 are generally electrons, the voltage of the FD region 118 may be negative (−) and the reference voltage REF to be compared therewith may also be negative (−). However, for convenience of explanation, these voltages will be described below as absolute values for comparison therebetween. When the voltage of the FD region 118 is higher than or equal to the reference voltage REF, it may be considered that charge saturation or overflow occurs in the pixel 110. For example, when the output of the comparator 122 is "1", charge saturation occurs and when the output of the comparator 122 is "0", charge saturation does not occur.

When the output of the comparator 122 is "1", the reset TR 116 is turned on, the FD region 118 is reset by a reset signal or a reset voltage Vpix and thus the charges accumulated in the FD region 118 are emptied. When the FD region 118 is emptied, charges in the PD 112 may also be emptied because the transmission TR 114 is on. Thus, resetting of the FD region 118 may correspond to resetting of the pixel 110. The storage unit 124 may store information regarding a change of an output signal of the comparator 122 from the L signal to the H signal or information regarding resetting of the FD region 118. During one frame, when the voltage of the FD region 118 is higher than or equal to the reference voltage REF, the FD region 118 is continuously reset to empty charges therefrom, and information regarding the number of times of changing from the L signal to the H signal by the comparator 122 or the number of times of resetting the FD region 118 may be stored in the storage unit 124. For example, one frame may represent a period during which pixel signals are read out from all the pixels 110 by the readout circuitry 130. For example, if this read out occurs every 10 ms, the storage unit 124 could sample the output of the comparator 122 every 2 ms during a current 10 ms frame period to determine whether its output for a given pixel is "1". The 2 ms sampling period and 10 ms frame period are merely examples, as these values can be changed as necessary. For example, if the output of the comparator 122 for a given pixel is "1" during 3 samples, then the storage unit 124 would store a count of 3 for the given pixel and the corresponding FD region 118 would have been reset 3 times.

In the normal mode NOR., the FD region 118 is connected to the first input terminal of the input terminal CMP_IN of the comparator 122 and the stepped ramp voltage RAMP is applied to the second input terminal of the input terminal CMP_IN of the comparator 122. Further, in the normal mode NOR., a reset TR line RX is connected to a gate of the reset TR 116, and the transfer TR line TX is continuously connected to the gate of the transfer TR 114. Additionally, in the normal mode NOR., the ADC 120 performs AD conversion on the pixel signal of the pixel 110 by using the stepped ramp voltage RAMP. In other words, the ADC 120 may perform AD conversion on the pixel signal, similar to an ADC of a general CIS. In this case, the storage unit 124 may be connected to a counter inside or outside the pixel area PA. In an exemplary embodiment, the reset TR line RC is set to a voltage during the AE mode AE that ensures that the reset TR 116 is turned off. In an exemplary embodiment, a switch or multiplexer is present that enables one of the reference voltage REF and stepped ramp voltage RAMP to be output to the comparator 122 based on the current mode. In an exemplary embodiment, a switch or multiplexer is present that causes either the output of the comparator 122 or the output of the reset TR line RX to be connected to the gate of the reset TR 116 based on the current mode.

Figure 5A:
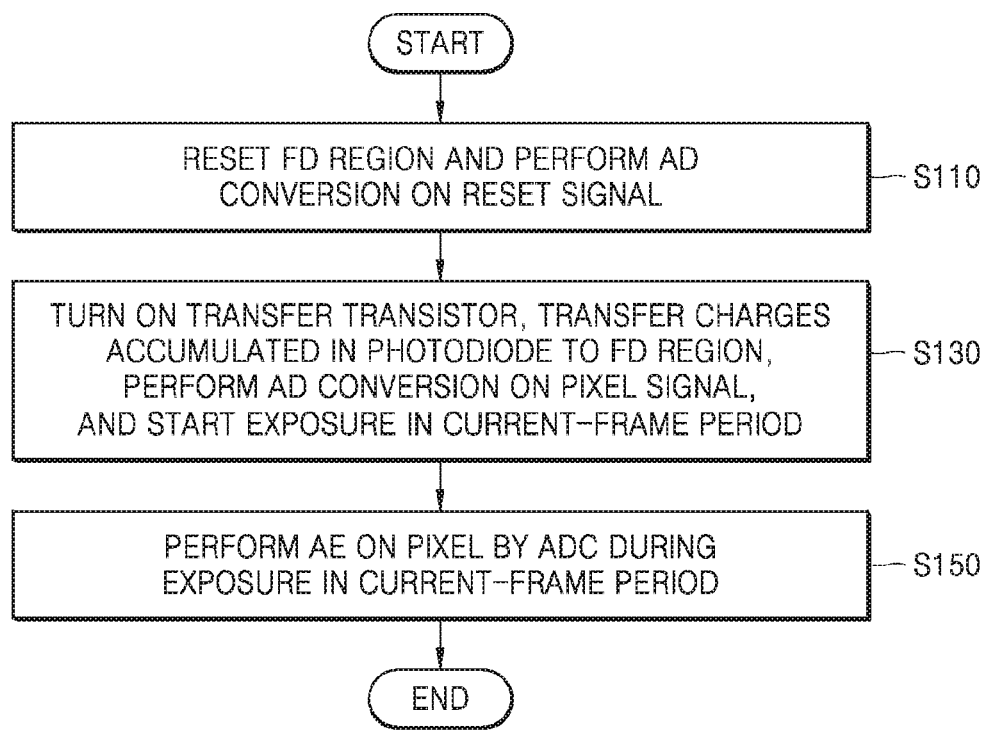
FIGS. 5A and 5B are respectively a flowchart and a timing diagram illustrating a process of performing AE in units of pixels by an ADC of each pixel in the CIS of FIG. 1 according to an exemplary embodiment of the inventive concept.
Figure 5B:
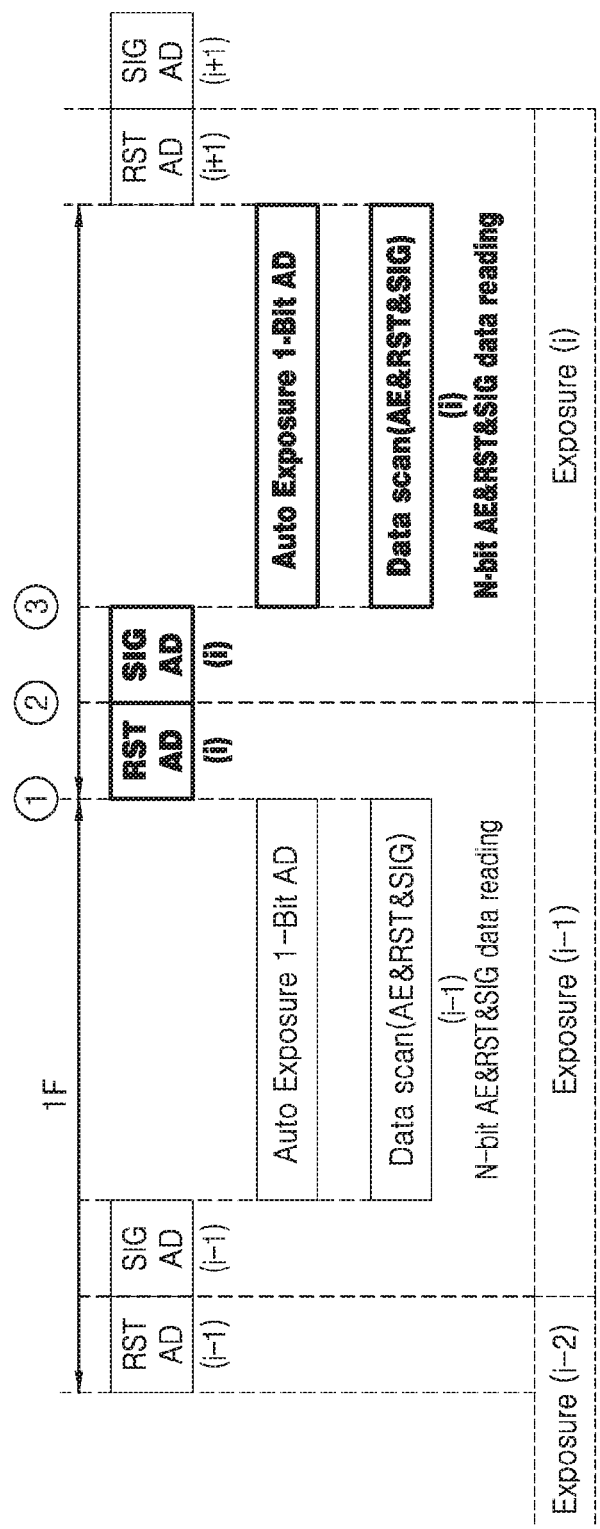

For reference, as illustrated in FIG. 5B, the AE mode AE. may be switched to the normal mode NOR during resetting of the FD region 118 and during AD conversion performed on a reset signal of the reset TR 116. Furthermore, the normal mode NOR. may be switched to the AE mode AE after AD conversion performed on the pixel signal of the pixel 110. The transfer TR line TX and the reset TR line RX may be connected to a row drive circuit that controls the transfer TR 114 and the reset TR 116. The row drive circuit applies a signal corresponding to an appropriate voltage to the transfer TR 114 and the reset TR 116 via the transfer TR line TX and the reset TR line RX so as to control turning the transfer TR 114 and the reset TR 116 on or off.

Figure 4A:
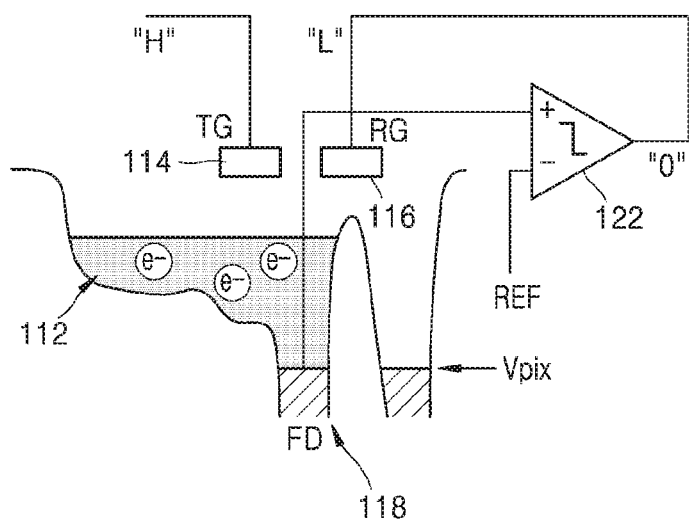
FIGS. 4A and 4B are conceptual diagrams for explaining a principle of performing auto exposure (AE) in units of pixels in the circuit diagram of FIG. 3.
Figure 4B:
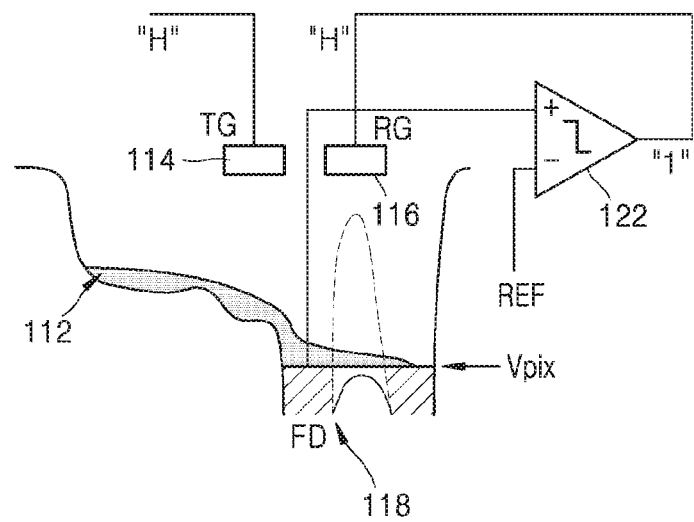

FIGS. 4A and 4B are conceptual diagrams for explaining a principle of performing AE in units of pixels in the circuit diagram of FIG. 3. The principle of FIGS. 4A and 4B will be described with reference to FIG. 3 together, and parts described above with reference to FIGS. 1 to 3 will be briefly described.

Referring to FIG. 4A, an H signal is applied to the gate of the transfer TR 114 and thus charges generated by the PD 112 are accumulated in the FD region 118. A voltage of the FD region 118 is lower than the reference voltage REF and thus the comparator 122 outputs an L signal (i.e., "0") and the reset TR 116 is maintained in an OFF state. The OFF state of the reset TR 116 may cause the occurrence of a potential barrier between the reset voltage Vpix corresponding to a reset signal and the voltage of the FD region 118. As such, as long as the voltage of the FD region 118 remains lower than the reference voltage REF, charges generated by the PD 112 are continuously accumulated in the FD region 118.

Referring to FIG. 4B, when charges are continuously accumulated in the FD region 118 and thus the voltage of the FD region 118 becomes equal to or greater than the reference voltage REF, an output of the comparator 122 is changed from an L signal to an H signal (i.e., the comparator 122 outputs "1") and the reset TR 116 is switched to the ON state. When the reset TR 116 is turned on, the potential barrier between the reset voltage Vpix and the voltage of the FD region 118 disappears and the voltage of the FD region 118 is reset to the reset voltage Vpix. That is, charges accumulated in the FD region 118 and the PD 112 are emptied by resetting by the reset voltage Vpix.

Thereafter, the voltage of the FD region 118 becomes lower than the reference voltage REF, the comparator 122 outputs an L signal (i.e., "0") and the reset TR 116 is maintained in the OFF state. Accordingly, charges are accumulated again in the PD 112 and the FD region 118.

When the intensity of light is very high, resetting may be performed a plurality of times in a one-frame duration. In other words, when the intensity of light is very high, charge may overflow or saturate very quickly and thus a voltage of the FD region 118 may become equal to or greater than the reference voltage REF and the overflow of charge may continue even after resetting, thereby causing resetting to be continuously performed. When the intensity of light is very low, resetting may not occur in a one-frame period.

FIGS. 5A and 5B are respectively a flowchart and a timing diagram illustrating a process of performing AE in units of pixels by an ADC of each pixel in the CIS of FIG. 1. The process of FIGS. 5A and 5B will be described with reference to FIG. 3 together, and descriptions given above with reference to FIGS. 1 to 4B will be briefly provided.

Referring to FIGS. 5A and 5B, first, the FD region 118 is reset and a reset signal of the reset TR 116 is analog-to-digital (AD) converted (S110). The AD conversion of the reset signal (S110) may correspond to a period from a time point ① to a time point ② in FIG. 5B. In FIG. 5B, RST may represent a reset signal.

The AD conversion of the reset signal (S110) may be performed before reading a pixel signal of the pixel 110 in a previous-frame period (exposure (i−1)). In other words, through the AD conversion of the reset signal (S110), the FD region 118 may be reset to a reference value before charges accumulated in the PD 112 in the previous-frame period (exposure(i−1)) arrive at the FD region 118, which is an output node, and thus, noise may be removed and a correlated double sampling (CDS) may be performed. Here, the CDS refers to a process of calculating the difference between the reference value set by resetting and a value of a charge transferred from the PD 112 to the FD region 118. Through the CDS, an actual charge generated in the pixel 110 (i.e., a pixel signal of the pixel 110) may be calculated accurately.

Next, the transfer TR 114 is turned on, charges accumulated in the PD 112 are transferred to the FD region 118, a pixel signal is AD converted, and exposure is started in a current-frame period (Exposure(i)) (S130). The starting of exposure in the current-frame period (Exposure (i)) (S130) may correspond to a period from a time point ② to a time point ③ in FIG. 5B. In FIG. 5B, SIG may represent a pixel signal. The starting of exposure in the current-frame period (Exposure (i)) (S130) may correspond to reading charges accumulated in the pixel 110 in the previous-frame period (Exposure(i−1)) as a pixel signal and performing AD conversion on the pixel signal.

Thereafter, AE is performed on the pixel 110 by the ADC 120 during the exposure in the current-frame period (Exposure (i)) (S150). The performing of AE on the pixel 110 (S150) may correspond to a period after a time point ③. The AE performed on the pixel 110 by the ADC 120 is as described above with reference to FIGS. 3 to 4B. That is, for the pixel 110 in which charge overflows, the FD region 118 may be reset by the comparator 122 and the reset TR 116 to empty charges therefrom, and information regarding the resetting of the FD region 118 may be stored in the storage unit 124. For example, the information may indicate how many times the FD region 118 was reset. As described above, the AE performed on the pixel 110 by the ADC 120 may correspond to 1-bit AD conversion.

During the performing of AE on the pixel 110, data scanning (i.e., data reading) may be performed by the readout circuitry 130. Scanned data may include reset information according to AE in the current-frame period (Exposure (i)), data regarding AD conversion of the reset signal, and data regarding AD conversion of the pixel signal. Here, the data regarding AD conversion of the reset signal and the pixel signal may be data of the previous-frame period (Exposure (i−1)) as illustrated in FIG. 5B. In addition, as described above, the reset information according to the AE may be used to implement WDR at a later time.

Figure 6A:
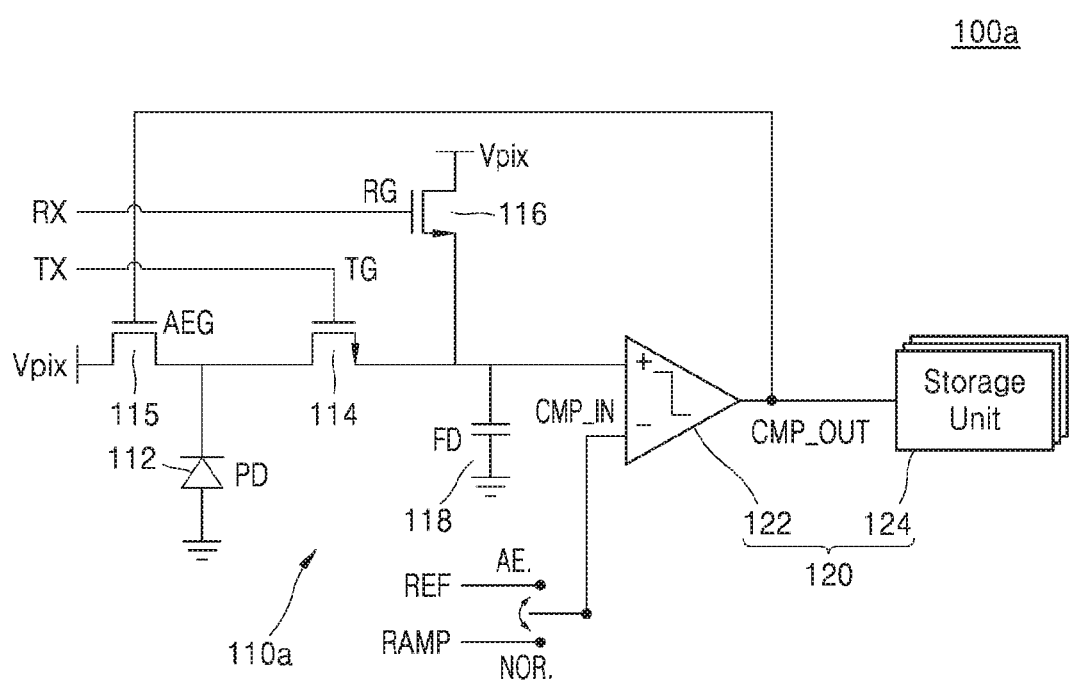
FIGS. 6A and 6B are circuit diagrams of a CIS including an ADC for each pixel, according to exemplary embodiments of the inventive concept.
Figure 6B:
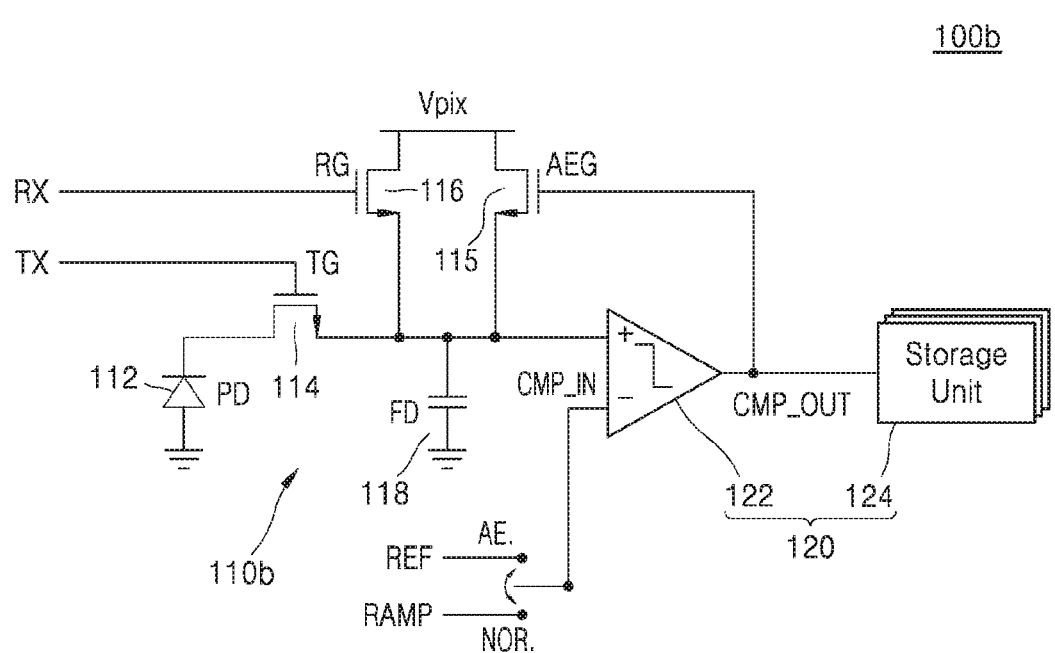

FIGS. 6A and 6B are circuit diagrams of CISs including an ADC for each pixel, according to exemplary embodiments of the inventive concept. Descriptions given above with reference to FIGS. 1 to 5B will be briefly provided.

Referring to FIG. 6A, a CIS 100a of the present embodiment may be different from the CIS 100 of FIG. 3 in that an AE TR (AEG) 115 for resetting an FD region 118 is further provided. In more detail, in the AE mode AE, the FD region 118 is connected to a first input terminal of an input terminal CMP_IN of a comparator 122 and a reference voltage REF is applied to a second input terminal of the input terminal CMP_IN of the comparator 122. In the AE mode AE., a storage unit 124 and a gate of the AE TR 115 are connected to an output terminal CMP_OUT of the comparator 122. A transfer TR line TX is connected to a gate of a transfer TR 114, and a reset TR line RX is connected to a gate of a reset TR 116.

In other words, in the CIS 100 of FIG. 3, an output signal of the comparator 122 is input to the gate of the reset TR 116, whereas in the CIS 100a of the present embodiment, an output signal of the comparator 122 is input to the gate of the AE TR 115, which is additionally provided. Thus, the reset TR 116 may operate substantially the same as in a general CIS regardless of the AE mode AE. The AE TR 115 may perform substantially the same function as the reset TR 116 in the CIS 100 of FIG. 3 in the AE mode AE.

For example, in the AE mode AE, a voltage of the FD region 118 and a reference voltage REF are compared with each other by the comparator 122, and an output of the comparator 122 is maintained to be an L signal when the voltage of the FD region 118 is lower than the reference voltage REF. That is, "0" is maintained. When the voltage of the FD region 118 is higher than or equal to the reference voltage REF, the output of the comparator 122 is changed from the L signal to an H signal. That is, the output of the comparator 122 is changed from "0" to "1". When the output of the comparator 122 is "1", the AE TR 115 is turned on, the FD region 118 is reset by a signal or a voltage Vpix of the AE TR 115, and thus, charges accumulated in the FD region 118 are emptied. The voltage Vpix of the AE TR 115 may be substantially the same as a reset voltage Vpix of the reset TR 116. Information regarding the change from the L signal to the H signal (e.g., reset information) may be stored in the storage unit 124.

In the normal mode NOR., the FD region 118 is connected to the first input terminal of the input terminal CMP_IN of the comparator 122 and a stepped ramp voltage RAMP is applied to the second input terminal of the input terminal CMP_IN of the comparator 122. In the normal mode NOR., the output terminal CMP_OUT of the comparator 122 is disconnected from the gate of the AE TR 115, and the AE TR 115 is maintained in an OFF state. In the normal mode NOR., an ADC 120 performs AD conversion on a pixel signal of a pixel 110a by using the stepped ramp voltage RAMP.

Because the AE TR 115 is arranged to be connected to the FD region 118 via the transfer TR 114, in the AE mode AE, charges in the FD region 118 may be emptied by being discharged to the AE TR 115 via the transfer TR 114 when the FD region 118 is reset. Charges in the PD 112 may be emptied by being discharged directly to the AE TR 115.

In the AE mode AE, the comparator 122 may transmit a signal of the output terminal CMP_OUT to the AE TR 115 to reset the FD region 118, and reset information may be stored in the comparator 122. In the normal mode NOR., the comparator 122 may transmit a signal of the output terminal CMP_OUT only to the storage unit 124, and to this end, the comparator 122 may additionally include a logic circuit.

Referring to FIG. 6B, a CIS 100b of the present embodiment is substantially the same as the CIS 100a of FIG. 6A in that an AE TR 115 for resetting an FD region 118 is additionally provided but may be different from the CIS 100a of FIG. 6A in terms of the position of the AE TR 115 in a pixel 110b. In an exemplary embodiment, the AE TR 115 is arranged to be connected directly to the FD region 118 rather than connected to the FD region 118 via a transfer TR 114. The CIS 100b of the present embodiment may operate substantially the same as the CIS 100a of FIG. 6A. However, based on a structure of connection to the FD region 118, in the AE mode AE, charges in the FD region 118 may be emptied by being discharged directly to the AE TR 115 when the FD region 118 is reset. Charges in the PD 112 may be emptied by being discharged to the AE TR 115 via the transfer TR 114.

Figure 7:
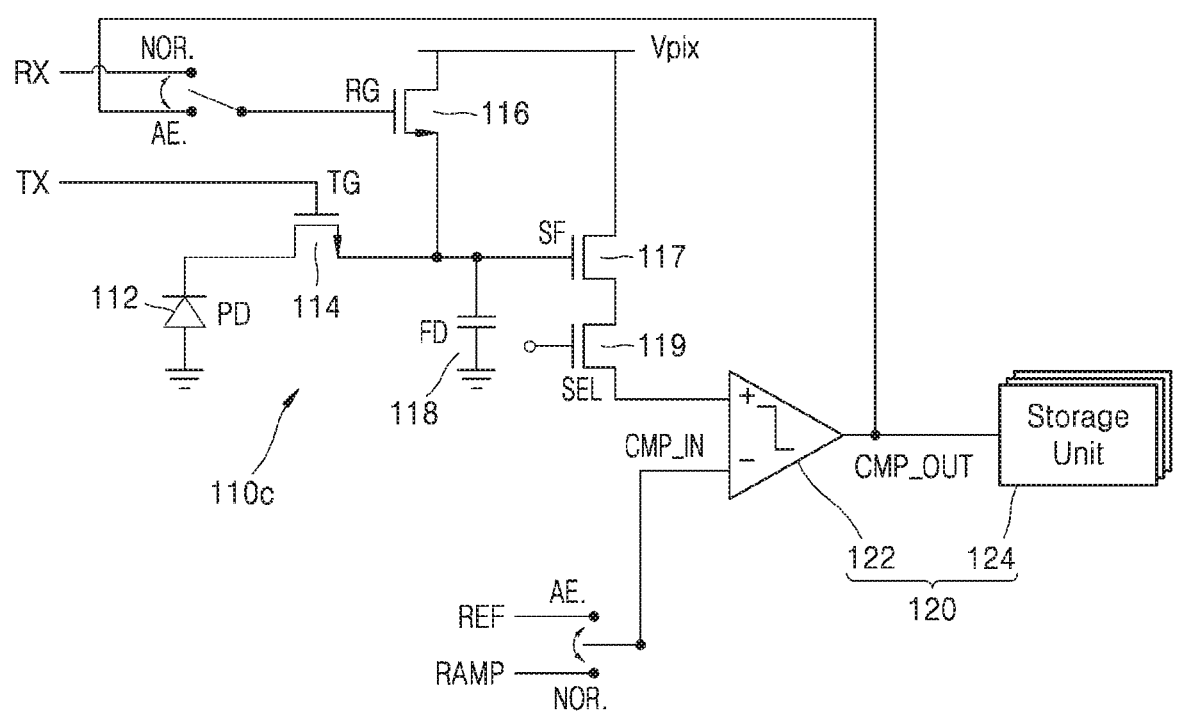
FIG. 7 is a circuit diagram of a CIS including an ADC for each pixel, according to an exemplary embodiment of the inventive concept.

FIG. 7 is a circuit diagram of a CIS including an ADC for each pixel, according to an exemplary embodiment of the inventive concept. Descriptions given above with reference to FIGS. 1 to 6B will be briefly provided.

Referring to FIG. 7, a CIS 100c of the present embodiment may be different from the CIS 100 of FIG. 3 in that each of pixels 110c further includes a source follower SF TR 117 and a selection TR SEL 119. More specifically, in the CIS 100c of the present embodiment, each of the pixels 110c includes a PD 112, a transfer TR 114, a reset TR 116, an FD region 118, the source follower TR 117, and the selection TR 119. A power supply voltage Vpix is applied to an input terminal of the source follower TR 117, the selection TR 119 is connected to an output terminal of the source follower TR 117, and the FD region 118 is connected to a gate of the source follower TR 117. The power supply voltage Vpix of the source follower TR 117 may be substantially the same as a reset voltage Vpix of the reset TR 116. In an exemplary embodiment, the source follower TR 117 is connected to an input terminal of the selection TR 119, a first input terminal of a comparator 122 is connected to an output terminal of the selection TR 119, and a selection TR line is connected to a gate of the selection TR 119.

In an exemplary embodiment, the source follower TR 117 is a buffer amplifier and may buffer a signal according to charges accumulated in the FD region 118, and the selection TR 119 is a transistor functioning as a switch and has a function of selecting a corresponding pixel. An output voltage of the selection TR 119 may be applied to the first input terminal of the comparator 122. The CIS 100*c* of the present embodiment may operate substantially the same as the CIS 100 of FIG. 3 in that AE is performed for each of the pixels 110*c* by an ADC 120 connected to each of the pixels 110*c*, except that each of the pixels 110*c* further includes the source follower TR 117 and the selection TR 119.

In the CIS 100*c* of the present embodiment, each of the pixels 110*c* further includes the source follower TR 117 and the selection TR 119 and thus may directly employ a 4-TR pixel structure. For example, in the CIS 100*c* of the present embodiment, a chip including pixels 110*c* having a 4-TR pixel structure and a chip including ADCs 120 may be stacked and the pixels 110*c* and the corresponding ADCs 120 may be electrically connected to each other in a circuit structure as illustrated in FIG. 7 to achieve an ADC for each pixel. In addition, in the CIS 100*c* of the present embodiment, because the ADC 120 is provided in each of the pixels 110*c*, it is not necessary to select the pixels 110*c* and thus the selection TR 119 may be omitted.

The circuit diagrams of the CISs 100 and 100*a* to 100*c*, each including an ADC for each pixel, are illustrated in FIGS. 3, 6A, 6B, and 7. However, a circuit diagram including an ADC for each pixel is not limited to the circuit diagrams of FIGS. 3, 6A, 6B, and 7. For example, a circuit diagram of a CIS including an ADC for each pixel according to an exemplary embodiment of the inventive concept may be understood to cover various circuit diagrams, in which the FD region 118 is reset by 1-bit AD conversion during exposure of pixels to light and a result of resetting the FD region 118 may be reflected in a final image.

Figure 8A:
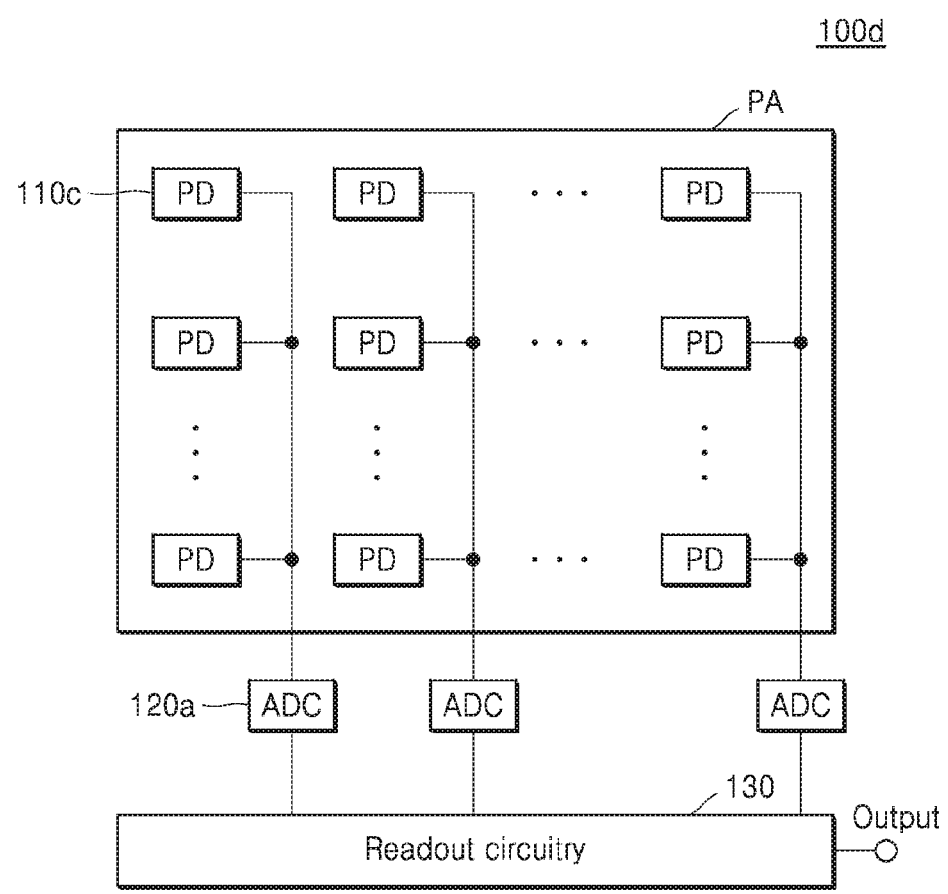
FIGS. 8A and 8B are respectively a block diagram of a CIS and a circuit diagram of the CIS including an ADC for each pixel, according to an exemplary embodiment of the inventive concept.
Figure 8B:
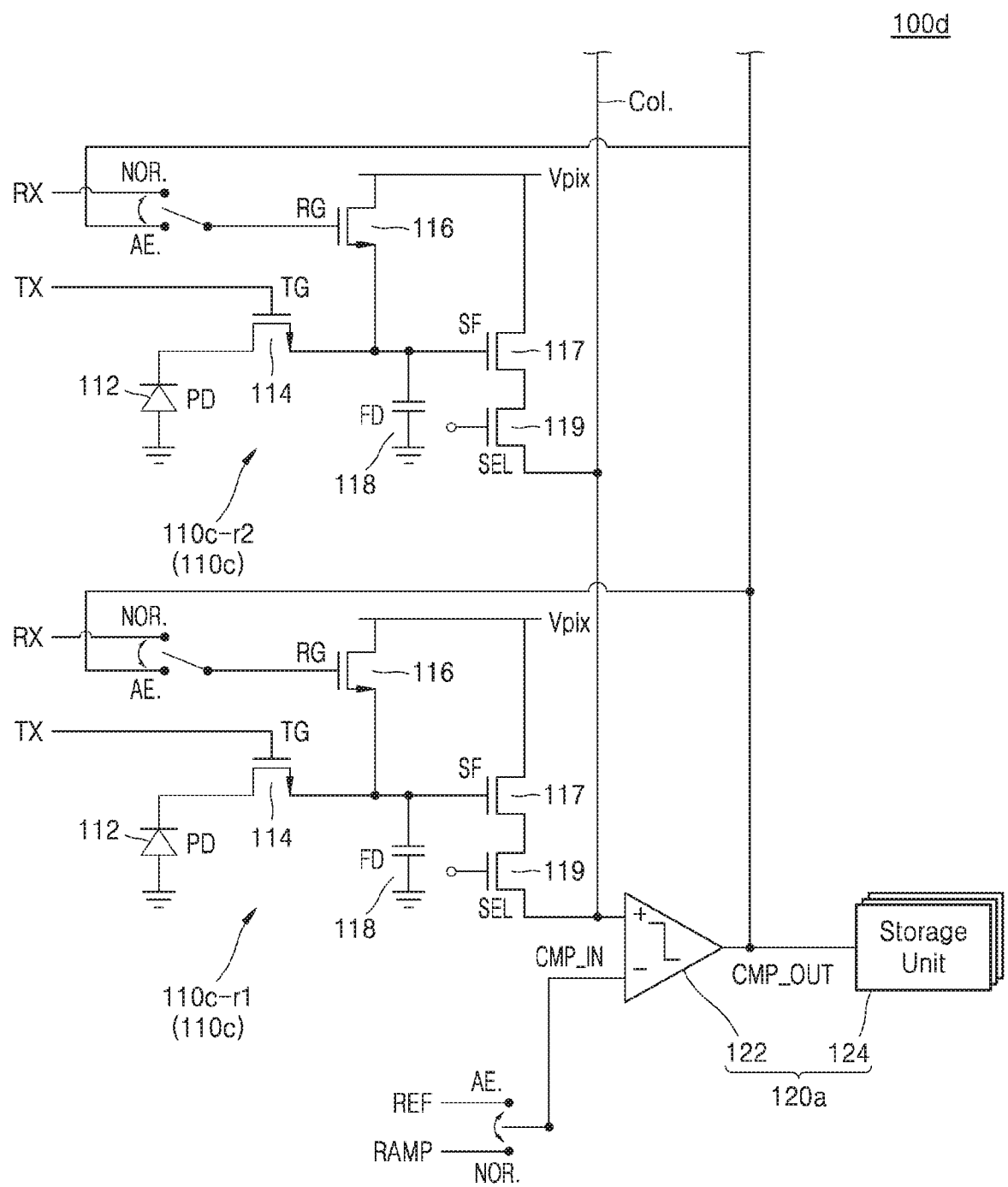

FIGS. 8A and 8B are a block diagram of a CIS and a circuit diagram of the CIS including an ADC for each pixel, according to an exemplary embodiment of the inventive concept. Descriptions given above with reference to FIGS. 1 to 7 will be briefly provided.

Referring to FIGS. 8A and 8B, a CIS 100*d* of the present embodiment differs from the CISs 100 and 100*a* to 100*c* of the previous other embodiments, in that the CIS 100*d* has a column ADC structure. In more detail, in the CIS 100*d* of the present embodiment, each of pixels 110*c* includes a PD 112, a transfer TR 114, a reset TR 116, an FD region 118, a source follower TR 117, and a selection TR 119, similar to the CIS 100*c* of FIG. 7. FIG. 8A illustrates that only a single PD is included in each of the pixels 110*c*, as in FIG. 1.

Unlike the CISs 100 and 100*a* to 100*c* of the previous other embodiments, the CIS 100*d* of the present embodiment has a structure in which a single ADC 120*a* is arranged in each column (i.e., a column ADC structure). Therefore, all pixels 110*c* arranged in one column are connected to one ADC 120*a*. For example, as illustrated in FIG. 8B, an output of a selection TR 119 of each of the pixels 110*c* in one column are commonly connected to a column line Col. and input to a first input terminal of a comparator 122 of the ADC 120*a*. However, pixel signals of all the pixels 110*c* connected to the column line Col. are not AD-converted at once, and only the pixel signal of the pixel 110*c* selected by the selection TR 119 is AD-converted by the ADC 120*a*. The operation of the selection TR 119 described above may be substantially the same as an operation of the selection TR of a general CIS having a column ADC structure. For example, the selection TR 119 of a first pixel 110*c-r*1 is turned on and the selection TR 119 of the second pixel 110*c-r*2 is turned off during a first period to AD-convert a first pixel signal and then the selection TR 119 of the second pixel 110*c-r*2 is turned on and the selection TR 119 of the first pixel 110*c-r*1 is turned off during a second period to AD-convert a second pixel signal.

In the CIS 100*d* of the present embodiment, the ADC 120*a* operates on a selected pixel 110*c* (e.g., a first pixel 110*c-r*1) in the AE mode AE., unlike in a general CIS. That is, in the AE mode AE., in the ADC 120*a*, the reference voltage REF is applied to a second input terminal of the comparator 122 and an output terminal of the comparator 122 is connected to a gate of a reset TR 116, similar to the CIS 100 of FIG. 3. With the above connection relationship, the ADC 120*a* may perform AE on the first pixel 110*c-r*1 in the AE mode AE. The AE performed on the first pixel 110*c-r*1 may be substantially the same as that performed on the pixel 110 in the CIS 100 of FIG. 3. Non-selected pixels 110*c* (e.g., a second pixel 110*c-r*2) may be maintained in the normal mode NOR. so that AE is not performed thereon. An operating mode of each pixel may be determined according to a result of a previous frame.

Accordingly, in the CIS 100*d* of the present embodiment, a column ADC structure is employed and an ADC for each pixel may be functionally implemented and thus AE may be performed in units of pixels. In other words, each of the ADCs 120*a* may be selectively connected to pixels 110*c* in a corresponding column in one of two modes, e.g., the AE mode AE. or the normal mode NOR. In addition, each of the ADCs 120*a* may operate in the AE mode AE. for only a single pixel 110*c* selected by the selection TR 119 and thus may perform AE on only a corresponding pixel. Thus, the same effect as when an ADC is provided for each pixel may be achieved in terms of functionality.

Figure 9:
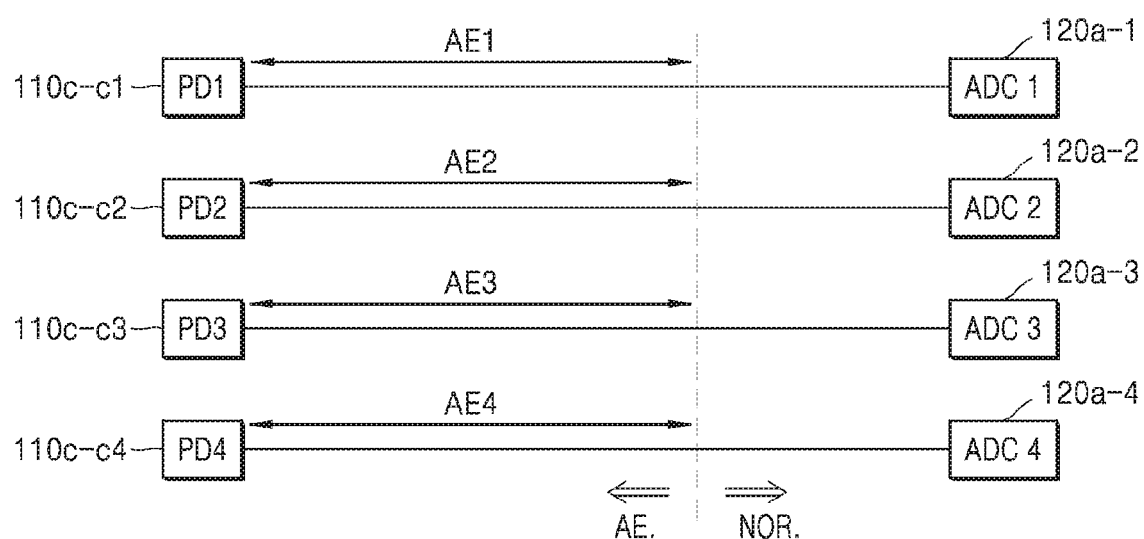
FIG. 9 is a timing diagram illustrating a process of performing AE on each pixel by an ADC for each pixel in the CIS of FIG. 8, according to an exemplary embodiment of the inventive concept.

FIG. 9 is a timing diagram illustrating a process of performing AE on each pixel by an ADC for each pixel in the CIS of FIG. 8. The process of FIG. 9 will be explained with reference to FIGS. 8A and 8B together.

Referring to FIG. 9, in the CIS 100*d* of the present embodiment, a readout circuitry 130 may read pixel signals in rows. Accordingly, the pixels 110*c* arranged in a row may be selected together by the corresponding selection TRs 119, and AD conversion may be performed on pixel signals therefrom by the corresponding ADCs 120*a*. For example, AD conversion may be performed on pixel signals of a first pixel 110*c-c*1, a second pixel 110*c-c*2, a third pixel 110*c-c*3 and a fourth pixel 110*c-c*4 from the left to the right among pixels 110*c* in a first row by a first ADC 120*a*-1, a second ADC 120*a*-2, a third pixel 120*a*-3, and a fourth ADC 120*a*-4, respectively.

AE may be performed on the pixels 110*c-c*1 to 110*c-c*4 by the ADCs 120*a*-1 to 120*a*-4 when an EIT is set to be relatively long, based on a low light intensity. In other words, AE may be performed in the AE mode AE. when there is some time left before the normal mode (NOR.) is operated, and the AE mode AE. cannot be operated and thus AE cannot be performed on a corresponding pixel when there is no time left before the normal mode (NOR.) is operated. For example, in general, all of the ADCs 120*a*-1 to 120*a*-4 may perform AD conversion in the same frame period, and the normal mode NOR. may be operated at the same time point to perform AD conversion on pixel signals of the pixels 110c-c1 to 110c-c4.

When AD conversion on the pixel signals of the pixels in the first row by the ADCs 120a-1 to 120a-4 has completed, AD conversion on pixel signals of pixels in a second row may be performed by the ADCs 120a-1 to 120a-4. Furthermore, AE may be performed in units of the pixels in the second row in the AE mode AE. by the ADCs 120a-1 to 120a-4. Through this process, AE may be performed in units of all the pixels 110c in a pixel array by the ADCs 120a-1 to 120a-4.

Figure 10A:
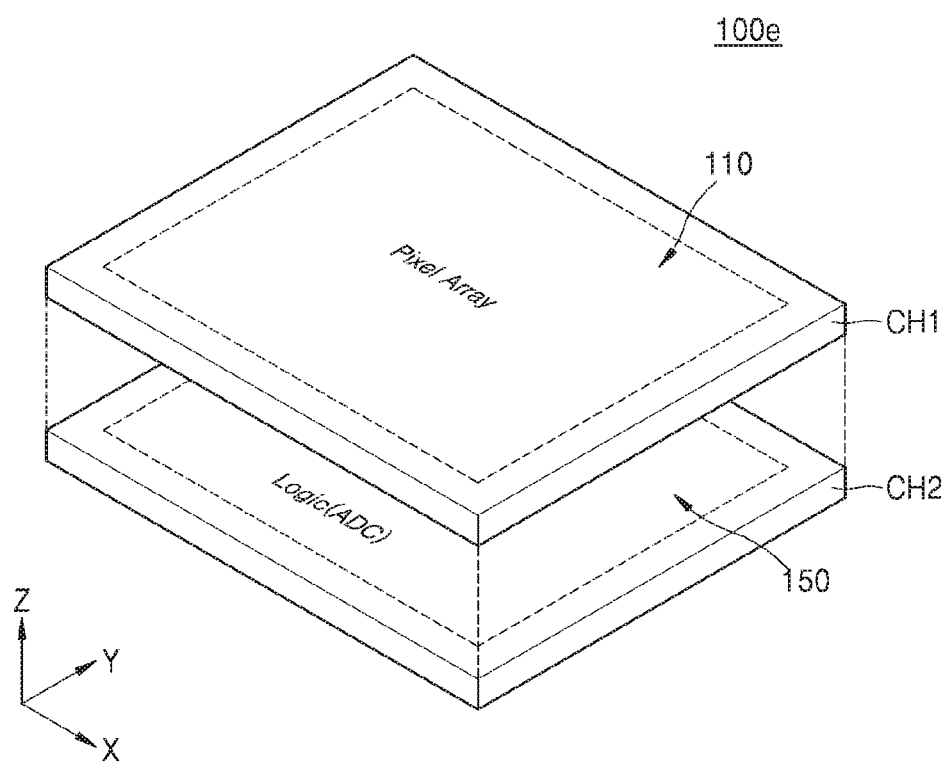
FIGS. 10A and 10B are respectively an exploded perspective view of a CIS and a plan view of a pixel chip and a logic chip using through silicon vias (TSVs), according to an exemplary embodiment of the inventive concept.
Figure 10B:
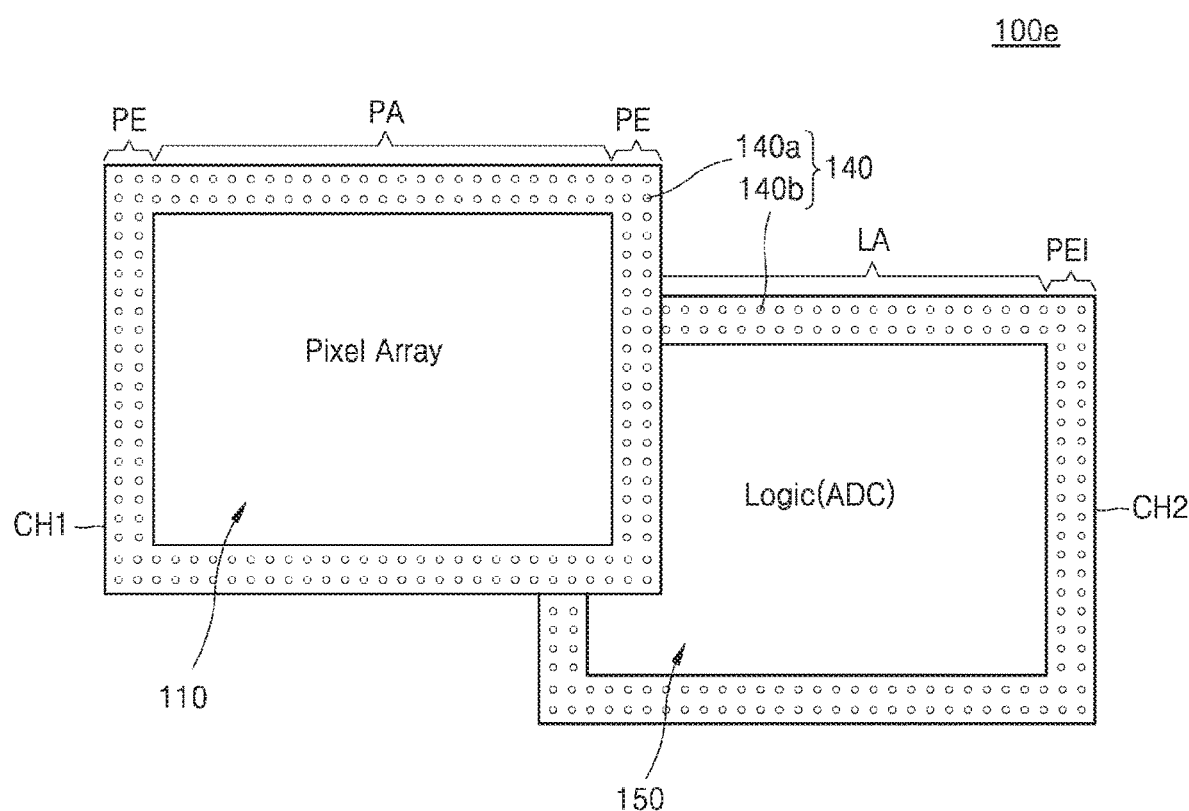

FIGS. 10A and 10B are an exploded perspective view of a CIS and a plan view of a pixel chip and a logic chip using through silicon vias (TSVs), according to an exemplary embodiment of the inventive concept. Descriptions given above with reference to FIGS. 1 to 9 will be briefly provided or a description thereof will be omitted here.

Referring to FIGS. 10A and 10B, a CIS 100e of the present embodiment may have a structure in which a pixel chip CH1 is stacked on a logic chip CH2. A plurality of pixels 110 may be arranged in a 2D array in the pixel chip CH1. For example, the pixel chip CH1 may include a pixel area PA and a peripheral area PE as illustrated in FIG. 10B. In the pixel area PA, a plurality of pixels 110 are arranged in a 2D array. In the peripheral area PE, interconnections, vertical contacts, and through vias for electrical connection to the logic chip CH2 may be provided. For example, a plurality of first through vias 140a may be provided in the peripheral area PE of the pixel chip CH1. In FIG. 10A, a part indicated as 'Pixel Array' inside a dotted line may correspond to the pixel area PA, and a part outside the dotted line may correspond to the peripheral area PE.

The pixels 110 in the pixel area PA may be provided at the top of the pixel chip CH1 in a third direction (a z-axis direction), and interconnection layers may be provided at the bottom of the pixel chip CH1. Although not shown, color filters and micro-lenses may be provided on the pixels 110 in the pixel area PA.

A plurality of interconnection lines extending in a first direction (an x-axis direction) and a second direction (a y-axis direction) may be provided on the interconnection layers of the pixel chip CH1. The interconnection lines are connected to the pixels 110, and signals may be output from the pixels 110 via the interconnection lines. The interconnection lines may extend from the pixel area PA to the peripheral area PE and be connected to the first through vias 140a in the peripheral area PE. The interconnection lines may be connected to logic circuits 150 of the logic chip CH2, e.g., the ADC 120 (see FIG. 1) and the readout circuitry 130 (see FIG. 1), via the first through vias 140a.

The logic chip CH2 may include the logic circuits 150. As illustrated in FIG. 10B, the logic chip CH2 may include a logic area LA and a peripheral area PE1 outside the logic area LA. The logic circuits 150 including the ADC 120, the readout circuitry 130, and the like may be provided in the logic region LA, and a plurality of second through vias 140b may be provided in the peripheral region PE1. In an exemplary embodiment, the logic chip CH2 further includes a memory area, and memory elements may be provided in the memory area.

The logic circuits 150 may be provided at the bottom of the logic chip CH2 in the third direction (the z-axis direction) and an interconnection layer may be provided at the top of the logic chip CH2. Similarly, a plurality of interconnection lines extending in the first direction (the x-axis direction) and the second direction (the y-axis direction) may be provided on the interconnection layer of the logic chip CH2 and connected to the logic circuits 150. As illustrated in FIG. 10A, the logic chip CH2 may be provided below the pixel chip CH1 and electrically connected to the pixel chip CH1 via the second through vias 140b.

The logic circuits 150 of the logic chip CH2 may include various circuits for processing signals from the pixels 110 of the pixel chip CH1. For example, the logic circuits 150 are not limited to the ADC 120 and the readout circuitry 130, and may include an analog signal processing circuit, an image signal processing circuit, a control circuit, and the like. However, the logic circuits 150 are not limited to the circuits described above.

In the CIS 100e of the present embodiment, the first through vias 140a may be provided in the pixel chip CH1, and the second through vias 140b may be provided in the logic chip CH2. The pixel chip CH1 and the logic chip CH2 may be electrically connected to each other via the first and second through vias 140a and 140b. Through vias 140 may be provided on all edges of four surfaces of each of the pixel chip CH1 and the logic chip CH2. However, an arrangement structure of the through vias 140 is not limited thereto. In an exemplary embodiment, the through vias 140 are not provided on an edge of at least one of the four surfaces of each of the pixel chip CH1 and the logic chip CH2.

The through vias 140 may be provided to penetrate all or some parts of each of the pixel chip CH1 and the logic chip CH2. For example, the first through vias 140a may penetrate the entire pixel chip CH1, and the second through via 140b may penetrate only a portion of an upper part of the logic chip CH2. The first through vias 140a and the second through vias 140b are distinguished from each other according to whether they are on the pixel chip CH1 or the logic chip CH2 for convenience of explanation but may be integrally formed with each other. In an exemplary embodiment, the first through vias 140a and the second through vias 140b are not separately formed on the pixel chip CH1 and the logic chip CH2, respectively, but are formed together as same through vias in the pixel chip CH1 and the logic chip CH2 by a through-via forming process after the pixel chip CH1 and the logic chip CH2 are combined with each other. The pixel chip CH1 and the logic chip CH2 may be stacked and combined with each other at a wafer level and thereafter be divided into stacked chips. However, the inventive concept is not limited thereto as other methods for stacking and combining of the pixel chip CH1 and the logic chip CH2 may be performed.

In an exemplary embodiment of the CIS 100e, the pixel chip CH1 is formed in a BackSide Illumination (BSI) structure. Accordingly, the first and second through vias 140a and 140b may be provided only in outer portions of the pixel chip CH1 and the logic chip CH2, e.g., the peripheral areas PE and PEI. This is because the first through vias 140a may be configured to penetrate the pixel chip CH1 and thus an area of the pixels 110 decreases when the first through vias 140a are provided in the pixel area PA. In an exemplary embodiment, in the BSI structure, the pixel chip CH1 is located between the micro-lenses and the logic chip CH2.

Although a structure in which the pixel chip CH1 and the logic chip CH2 are combined with each other via the through vias 140 has been described above, the combination of the pixel chip CH1 and the logic chip CH2 is not limited to using the through vias 140. For example, the pixel chip CH1 and the logic chip CH2 may be combined with each other in various ways, e.g., Cu—Cu bonding, bonding by through vias and Cu pads, bonding by through vias and external connection terminals, or bonding by integral through vias.

A structure in which the pixel chip CH1 and the logic chip CH2 are combined by Cu—Cu bonding will be described in more detail below. The pixels 110 in the pixel area PA may be provided at the top of the pixel chip CH1 in the third direction (the z-axis direction), and a first interconnection may be provided at the bottom of the pixel chip CH1. In addition, a first insulating layer may be provided on a bottom surface of the pixel chip CH1, and a first Cu pad may be provided to penetrate the first insulating layer. The first Cu pad may be connected to the first interconnection layer and exposed from the first insulating layer. The first Cu pad is provided at the bottom of the pixel chip CH1 and thus may not affect the pixels 110 in the pixel area PA, which are provided at the top of the pixel chip CH1. Therefore, the first Cu pad may be provided in the entire pixel area PA and the entire peripheral area PE of the pixel chip CH1 regardless of the pixels 110. However, in another embodiment, the first Cu pad may be provided only in the peripheral area PE.

A second interconnection layer may be provided at the top of the logic chip CH2 in the third direction (the z-axis direction), and the logic circuits 150 in the logic region LA may be provide at the bottom of the logic chip CH2. A second insulating layer may be provided on an upper surface of the logic chip CH2 and a second CU pad may be provided to penetrate the second insulating layer. The second Cu pad may be connected to the second interconnection layer and exposed from the second insulating layer.

The first Cu pad and the second Cu pad may be separately formed on the pixel chip CH1 and the logic chip CH2, respectively, and bonded to each other to be electrically connected to each other when the pixel chip CH1 and the logic chip CH2 are combined with each other. For example, the first Cu pad and the second Cu pad may be bonded to each other to be electrically connected to each other by aligning the pixel chip CH1 and the logic chip CH2 such that the first Cu pad and the corresponding second Cu pad face each other, and then a compression and heat treatment are performed.

The stacking and combining of the pixel chip CH1 and the logic chip CH2 by Cu—Cu bonding may be performed at a wafer level. For example, a first wafer including the pixel chips CH1 and a second wafer including the logic chips CH2 may be bonded to each other by Cu—Cu bonding and be thereafter divided into a plurality of stacked structures by a sawing process or the like. Each of the stacked structures may have a two-layer structure including the pixel chip CH1 and the logic chip CH2.

In the CIS 100e of the present embodiment, the pixel 110 and the ADC 120 of the CIS 100 of FIG. 1 may be connected to each other in a circuit structure as illustrated in FIG. 3. Accordingly, in the CIS 100e of the present embodiment, AE may be performed in units of pixels by ADCs for respective pixels and an EIT may be adjusted in units of pixels, similar to the CIS 100 of FIG. 1. Therefore, in the CIS 100e of the present embodiment, limitations on full-well capacity (FWC) of fine-size pixels may be overcome and WDR may be easily performed without an additional high-capacity capacitor, based on AE performed in units of pixels by the ADCs 120 for respective pixels and an EIT adjusted in units of pixels. In addition, the CIS 100e of the present embodiment is not limited to the CIS 100 of FIG. 1, and may have a circuit structure in which the pixels 110 and the ADCs 120 are connected to achieve ADCs for respective pixels, as in one of the CISs 100a to 100d of FIGS. 6A, 6B, 7 and 8B.

Figure 11:
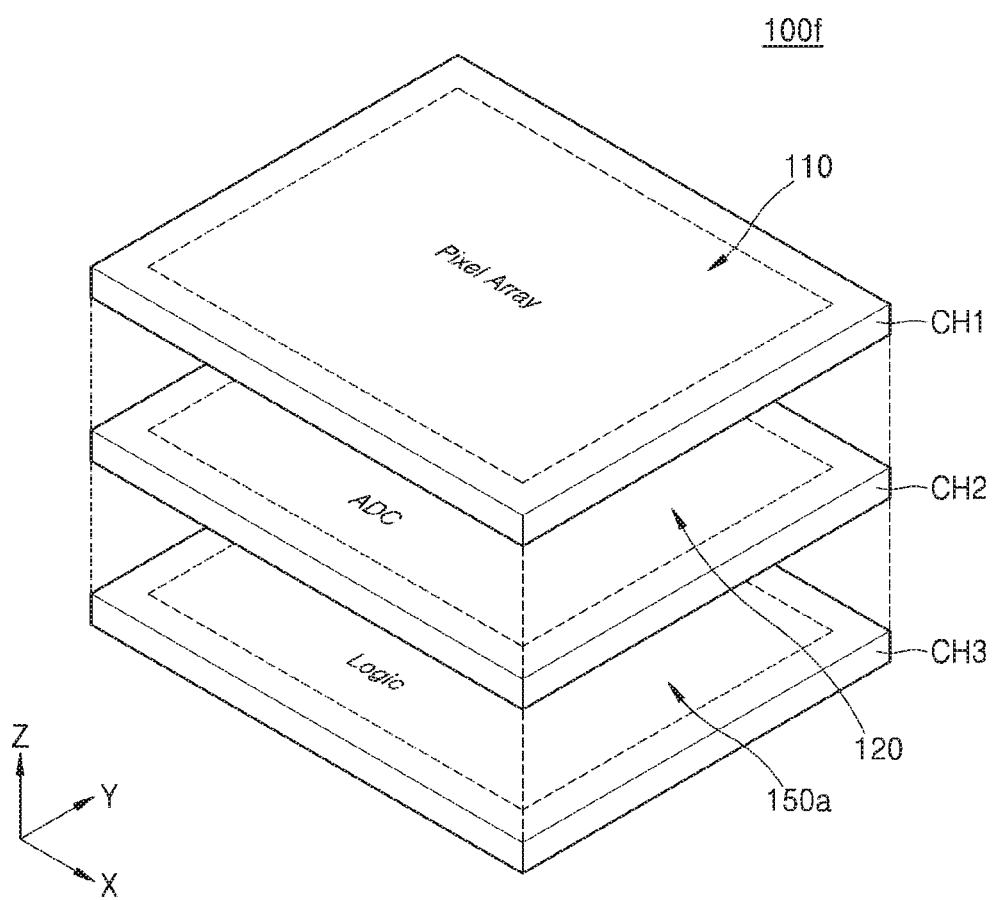
FIG. 11 is an exploded perspective view of a CIS according to an exemplary embodiment of the inventive concept.

FIG. 11 is an exploded perspective view of a CIS according to an exemplary embodiment of the inventive concept. Descriptions given above with reference to FIGS. 1 to 10B will be briefly provided.

Referring to FIG. 11, a CIS 100f of the present embodiment may differ from the CIS 100e of FIG. 10A in that it includes a stacked structure of three semiconductor chips CH1, CH2, and CH3. In an exemplary embodiment, the CIS 100f of the present embodiment includes a pixel chip CH1 on which pixels are arranged, and two logic chips CH2 and CH3 on which logic circuits are arranged. The two logic chips CH2 and CH3 may include a first logic chip CH2 on which ADCs 120 are arranged, and a second logic chip CH3 on which various signal processing circuits, including a readout circuitry 130 except the ADCs 120, are arranged.

In the CIS 100f of the present embodiment, the pixel chip CH1 may be provided on the first logic chip CH2 in a third direction (a z-axis direction) and the second logic chip CH3 may be provided below the first logic chip CH2. In an exemplary embodiment, the pixel chip CH1 and the first logic chip CH2 are combined with each other such that an interconnection layer on a lower portion of the pixel chip CH1 faces an interconnection layer on an upper portion of the first logic chip CH2, and the first logic chip CH2 and the second logic chip CH3 are bonded to each other such that ADCs 120 on a lower portion of the first logic chip CH2 face an interconnection layer on an upper portion of the second logic chip CH3.

The combination of the pixel chip CH1 and the first logic chip CH2 is as described above with respect to the CIS 100e of FIGS. 10A and 10B. The first logic chip CH2 and the second logic chip CH3 may be combined with each other using through vias. However, embodiments of the inventive concept are not limited thereto and first logic chip CH2 and the second logic chip CH3 may be combined with each other by Cu—Cu bonding.

In addition, in the CIS 100f of the present embodiment, the pixel chip CH1, the first logic chip CH2, and the second logic chip CH3 may be combined with one another at a wafer level. For example, a first wafer including pixel chips CH1, a second wafer including first logic chips CH2, and a third wafer including second logic chips CH3 may be combined with one another and be thereafter divided into a plurality of stacked structures by a sawing process or the like. Each of the stacked structures may have a three-layer structure including the pixel chip CH1, the first logic chip CH2, and the second logic chip CH3.

Although CIS s of a two-layer structure or a three-layer structure have been described above, a layer structure of a CIS is not limited thereto. For example, a CIS according to an exemplary embodiment of the inventive concept may have a four-layer structure. When having the four-layer structure, the CIS may include a pixel chip on which pixels are disposed, two logic chips on which logic elements are disposed, and a memory chip on which memory elements are disposed from top to bottom. As described above, the two logic chips may include a first logic chip in which ADCs 120 are disposed and a second logic chip in which various signal processing circuits, including a readout circuitry other than the ADCs 120, are disposed.

As described above, in the CIS 100e of FIG. 10A, the logic chip CH2 may include a memory region and memory elements may be disposed in the memory region. In a four-layer CIS, a memory chip in which memory elements are disposed may be provided below a second logic chip. The memory elements may be arranged in a 2D array in a cell area CA of the memory chip. The memory elements may be used as image buffer memories for storing frame images. The memory chip may include a peripheral area PE outside the cell area CA. The memory elements of the cell area CA may be positioned at the top of the memory chip in the third direction (the z-axis direction), and a third interconnection layer may be positioned at the bottom of the memory chip.

These chips may be combined with each other in various ways. For example, the chips may be combined with each other by Cu—Cu bonding, bonding by through vias and Cu pads, bonding by through vias and external connection terminals, bonding by integral through vias, or the like.

While the inventive concept has been particularly shown and described with reference to embodiments thereof, it will be understood that various changes in form and details may be made therein without departing from the spirit and scope of the disclosure.

What is claimed is:

1. A complementary metal oxide (CMOS) image sensor (CIS) comprising:
a plurality of pixels arranged in a two-dimensional (2D) array and each including a photodiode and a reset transistor;
a plurality of analog-to-digital converters (ADCs) configured to perform auto exposure (AE) in units of the pixels during an AE mode; and
a readout circuit configured to read pixel signals of the pixels in rows,
wherein the plurality of pixels and the plurality of ADCs are the same in number and are connected in a one-to-one correspondence to each other, and each of the plurality of ADCs performs AE on a corresponding one of the pixels,
wherein a reference voltage is provided to an input of a comparator of an ADC of one of the pixels and an output of the comparator is supplied to a gate of the reset transistor of the one pixel during the AE mode, and a stepped ramp voltage is provided to the same input and the gate is disconnected from the output during a normal mode.

2. The CIS of claim 1, wherein each of the plurality of ADCs comprises:
the comparator configured to determine whether a charge overflow occurred in the corresponding pixel; and
a storage device configured to store an output signal of the comparator.

3. The CIS of claim 2,
wherein each of the pixels comprises a transfer transistor,
wherein a charge generated by the photodiode is stored in a floating diffusion (FD) region via the transfer transistor,
wherein the FD region is connected to a first input terminal of the comparator, and the reference voltage is applied to a second input terminal of the comparator,
wherein an output signal of the comparator is changed from a first logic level to a second other logic level when a voltage of the FD region is greater than or equal to the reference voltage, and
wherein information regarding the change of the first logic level to the second logic level is stored in the storage device.

4. The CIS of claim 3, wherein an output of the comparator is supplied to a gate of the reset transistor, and the reset transistor is turned on to reset the FD region when the output of the comparator is changed to the second logic level.

5. The CIS of claim 3,
wherein the reference voltage is applied to the second input terminal and the output signal of the comparator is supplied to the gate of the reset transistor during the AE mode in which AE is performed, and
wherein the stepped ramp voltage is applied to the second input terminal and a reset transistor line is connected to the gate of the reset transistor during the normal mode in which analog-to-digital (AD) conversion is performed on a given one of the pixel signals.

6. The CIS of claim 3,
wherein each of the pixels further comprises an AE transistor connected to the FD region directly or via the transfer transistor,
wherein an output of the comparator is supplied to a gate of the AE transistor, and
wherein the AE transistor is turned on to reset the FD region when the output of the comparator is changed to the second logic level.

7. The CIS of claim 3,
wherein each of the pixels further comprises a source follower transistor and a selection transistor, and
wherein the FD region is connected to the first input terminal of the comparator via the source follower transistor and the selection transistor.

8. The CIS of claim 1, wherein the storage device comprises least one of a shift register, a counter, or a memory.

9. The CIS of claim 1, wherein the pixel signals represent an image signal and an image compensation is performed on the image signal for wide dynamic range (WDR) by performing the AE in units of the pixels.

10. A complementary metal oxide (CMOS) image sensor (CIS) comprising:
an upper chip comprising a plurality of pixels each including a photodiode, the pixels arranged in a two-dimensional (2D) array; and
at least one lower chip comprising a plurality of analog-digital converters (ADCs) and signal processing circuits, wherein the plurality of ADCs perform auto exposure in units of the pixels and the signal processing circuits process pixel signals from the pixels,
wherein the upper chip is stacked on the at least one lower chip, and the pixels and the ADCs are connected in a one-to-one correspondence to each other, and
wherein each pixel includes a floating diffusion (FD) region for storing a charge generated by the corresponding photodiode, a reset transistor, a multiplexer, and a source follower transistor having a non-gate terminal connected to an input of one of the ADCs, where the FD region is connected to a gate of the source follower transistor,
wherein the multiplexer connects a gate of the reset transistor to a reset transistor line and an input of the one ADC receives a stepped ramp voltage, during a normal mode,
wherein the multiplexer connects the gate to an output of the one ADC and the input receives a reference voltage, during an auto exposure (AE) mode.

11. The CIS of claim 10, wherein each of the ADCs comprises:
a comparator; and
a storage device configured to store an output signal of the comparator,
wherein each of the pixels further comprises a transfer transistor, and
wherein a charge generated by the photodiode is stored in a floating diffusion (FD) region via the transfer transistor,
wherein the FD region is connected to a first input terminal of the comparator via the source follower transistor, and the reference voltage is applied to a second input terminal of the comparator,
wherein an output signal of the comparator is changed from a first logic level to a second other logic level or from the second logic level to the first logic level, and the reset transistor is turned on to reset the FD region when a voltage of the FD region is greater than or less than the reference voltage, and wherein information regarding the change from the first logic level to the second logic level or from the second logic level to the first logic level is stored in the storage device.

12. The CIS of claim 11, wherein the reference voltage is applied to the second input terminal and an output of the comparator is supplied to a gate of the reset transistor during the AE mode in which AE is performed, and wherein the stepped ramp voltage is applied to the second input terminal during the normal mode in which analog-to-digital (AD) conversion is performed on a given one of the pixel signals.

13. The CIS of claim 11, wherein the pixel signals represent an image signal and an image compensation is performed on the image signal for wide dynamic range (WDR) by performing the AE in units of the pixels.

14. The CIS of claim 10, wherein the at least one lower chip comprises:

a first lower chip in which the ADCs are arranged; and a second lower chip in which the signal processing circuits are arranged, and wherein the upper chip, the first lower chip, and the second lower chip are sequentially stacked.

15. A method of operating a complementary metal oxide (CMOS) image sensor (CIS) comprising a plurality of pixels each including a photodiode and a reset transistor, the CIS further comprising a plurality of analog-to-digital converters (ADCs) connected in one-to-one correspondence to the pixels, the method comprising:

resetting floating diffusion (FD) regions of the pixels and performing analog-to-digital (AD) conversions on reset signals of reset transistors of the pixels by the plurality of ADCs;

transferring charges accumulated in the photodiodes to the FD regions by turning on transfer transistors of the pixels and thereafter performing AD conversion on pixel signals of the pixels and starting an exposure in a current-frame period;

performing an auto exposure (AE) on the plurality of pixels by the plurality of ADCs during the exposure in the current-frame period, the performing including supplying a reference voltage to an input of a comparator of an ADC of one of the pixels and connecting an output of the comparator to a gate of the reset transistor of the one pixel, and supplying a stepped ramp voltage to the input and disconnecting the gate from the output of the comparator, during a normal mode.

16. The method of claim 15, wherein each of the plurality of ADCs comprises:

the comparator; and a storage device configured to store an output signal of the comparator, and wherein the performing of the AE on a given pixel among the plurality of pixels in which an overflow occurs comprises:

resetting the FD region of the given pixel by a corresponding one of the ADCs; and storing reset information of the FD region.

17. The method of claim 16, wherein the FD region is connected to a first input terminal of the comparator, and the reference voltage is applied to a second input terminal of the comparator, wherein an output of the comparator is supplied to the gate of the reset transistor, wherein an output signal of the comparator is changed from a first logic level to a second other logic level or from the second logic level to the first logic level when a voltage of the FD region of the given pixel in which the overflow occurs becomes greater or less than the reference voltage, wherein the reset transistor is turned on to reset the FD region, and wherein the reset information is stored in the storage device.

18. The method of claim 16, wherein the reference voltage is applied to a second input terminal of the comparator and the output signal of the comparator is supplied to the gate of the reset transistor during the AE mode in which AE is performed, and wherein the stepped ramp voltage is applied to the second input terminal and a reset transistor line is connected to the gate of the reset transistor during the normal mode to perform AD conversion on a given one of the pixel signals.

19. The method of claim 16, further comprising performing image compensation on an image of the pixel signals for wide dynamic range (WDR) using the reset information.

* * * * *